(12) United States Patent
Matthew et al.

(10) Patent No.: US 12,332,991 B2
(45) Date of Patent: Jun. 17, 2025

(54) HARDWARE AUTHENTICATION DEVICE (71) Applicant: RSA Security LLC, Bedford, MA (US)

(72) Inventors: Kerry Matthew, Clinton, MA (US);
Thomas Levins, Wilton, NH (US);
Mohamed Ibrahim Ahmed Hassan Mahmoud, Alexandria (EG)

(73) Assignee: RSA SECURITY USA, LLC, Burlington, MA (US)

( * ) Notice: Subject to any disclaimer, the term of this patent is extended or adjusted under 35 U.S.C. 154(b) by 186 days.

(21) Appl. No.: 17/873,707

(22) Filed: Jul. 26, 2022

(65) Prior Publication Data
US 2024/0037209 A1 Feb. 1, 2024

(51) Int. Cl.
*G06F 21/34* (2013.01)

(52) U.S. Cl.
CPC ...... *G06F 21/34* (2013.01); *G06F 2221/2153* (2013.01)

(58) Field of Classification Search
CPC .......................... G06F 21/34; G06F 2221/2153
USPC ............................................................ 726/9
See application file for complete search history.

(56) References Cited

U.S. PATENT DOCUMENTS

| 10,007,774 B2 | 6/2018 | Hama et al. |
| 11,316,312 B2 | 4/2022 | Justin |
| 2002/0147698 A1* | 10/2002 | Tree ...................... G06F 1/1656 |
| 2006/0294023 A1 | 12/2006 | Lu |
| 2008/0168543 A1* | 7/2008 | von Krogh ............... H04L 9/12 726/9 |
| 2010/0064360 A1 | 3/2010 | Lin et al. |
| 2011/0099384 A1* | 4/2011 | Grange ................ H04L 9/3234 713/184 |
| 2011/0274273 A1* | 11/2011 | Fiske ...................... G06F 21/46 380/46 |
| 2016/0196220 A1* | 7/2016 | Perez .................... G06F 13/102 710/73 |

FOREIGN PATENT DOCUMENTS

CN 203858634 U 10/2014

OTHER PUBLICATIONS

Extended European Search Report for European Pat. Appl. No. 23172005.3, dated Dec. 4, 2023, 8 pgs.
"Dell Adapter DA200—USB-C to HDMI/VGA/Ethernet/USB 3.0" Item#: 9SIAM4SETH8945, available at https://www.newegg.com/global/jp-en/dell-da200-usb-c-to-hdmi-vga-ethernet-usb-3-0/p/N82E16886124058.

* cited by examiner

*Primary Examiner* — Michael S McNally
(74) *Attorney, Agent, or Firm* — Husch Blackwell LLP (57) ABSTRACT

Authentication devices and methods. The authentication device includes a connection component configured to establish a physical connection with a computing system configured to perform at least an authentication procedure, a housing including a screen portion to at least visually present authentication data as part of an interaction with the computing system, and a cable portion connecting the housing and the connection component, wherein the cable portion is configured to prevent stress from being imparted on the connection component at least due to handling of the housing.

18 Claims, 7 Drawing Sheets

HARDWARE AUTHENTICATION DEVICE

TECHNICAL FIELD

Embodiments described herein generally relate to hardware devices and, more particularly but not exclusively, to hardware authentication devices.

BACKGROUND

Hardware authentication devices such as security tokens allow a user to, inter alia, authenticate with and gain access to a resource. Operating these types of security tokens typically involve a user presenting a password generated by the token for authentication by a computing system, possibly by physically connecting the token to a port of the computing system.

Physically connecting these security tokens often places stress on the token and on the port of the computing system. For example, repeated insertion and removal of the security token to and from the port may place stress on the connectors of the token and the port. Existing token devices are also generally formed of a single, rigid component. This does not allow a user to, for example, manipulate the orientation of the token during operation, for example, if the token display is "upside down" relative to the user when connected to the computing system.

A need exists, therefore, for devices and methods that overcome the disadvantages of existing security tokens.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

According to one aspect, embodiments relate to a hardware authentication device. The hardware authentication device comprises a connection component configured to establish a physical connection with a computing system, a housing including a screen portion to at least visually present authentication data as part of an interaction with the computing system, and a cable portion connecting the housing and the connection component, wherein the cable portion is configured to prevent stress from being imparted on the connection component at least due to handling of the housing.

In some embodiments, the authentication data includes a single-use password.

In some embodiments, the housing further includes an activation component engageable as part of the interaction with the computing system, the handling including engagement of the activation component. In some embodiments, the activation component includes at least one of a depressible portion and a switch, wherein the handling of the housing includes engagement with the depressible portion or the switch.

In some embodiments, the housing further includes one or more processors executing instructions stored on memory to execute at least one of a one-time password (OTP) authentication procedure or a Fast IDentity Online (FIDO) authentication procedure.

In some embodiments, the housing is movable with respect to the connection component in six degrees of motion while the connection component is physically connected with the computing system.

In some embodiments, the housing further includes an aperture to store the connection component when the connection component is not physically connected with the computing system.

In some embodiments, the housing is sized to include a battery and the screen portion is sized to at least visually present a password.

In some embodiments, the cable portion is configured to prevent stress from being imparted on the computing system at least due to handling of the housing.

In some embodiments, the interaction with the computing system includes at least one of a credential registration process, an authentication procedure, and a hardware authentication device management procedure.

According to another aspect, embodiments relate to a method of manufacturing a hardware authentication device. The method includes providing a housing including a screen portion to at least visually present authentication data as part of an interaction with a computing system; configuring the housing with a cable portion; and connecting a connection component to the cable portion, wherein the connection component is configured to establish a physical connection with the computing system, and the cable portion is configured to prevent stress from being imparted on the connection component at least due to handling of the housing.

In some embodiments, the authentication data includes a single-use password.

In some embodiments, the method further includes configuring the housing with an activation component engageable as part of the interaction with the computing system, the handling including engagement of the activation component. In some embodiments, the activation component includes at least one of a depressible portion and a switch, wherein the handling of the housing includes engagement with the depressible portion or the switch.

In some embodiments, the housing further includes one or more processors executing instructions stored on memory to execute at least one of a one-time password (OTP) authentication procedure or a Fast IDentity Online (FIDO) authentication procedure.

In some embodiments, the housing is movable with respect to the connection component in six degrees of motion while the connection component is physically connected with the computing system.

In some embodiments, the method further includes configuring the housing with an aperture to store the connection component when the connection component is not physically connected with the computing system.

In some embodiments, the housing is sized to include a battery and the screen portion is sized to at least visually present a password.

In some embodiments, the cable portion is configured to prevent stress from being imparted on the computing system at least due to handling of the housing.

In some embodiments, the interaction with the computing system includes at least one of a credential registration process, an authentication procedure, and a hardware authentication device management procedure.

BRIEF DESCRIPTION OF DRAWINGS

Non-limiting and non-exhaustive embodiments of the invention are described with reference to the following figures, wherein like reference numerals refer to like parts throughout the various views unless otherwise specified.

DETAILED DESCRIPTION

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment. The appearances of the phrase "in some embodiments" in various places in the specification are not necessarily all referring to the same embodiments.

Some portions of the description that follow are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

Existing security tokens are typically formed as a single, rigid component. This rigidity can cause damage to the token itself, to a computer port, or both. Security tokens may require the repeated insertion into a computer port (e.g., a Universal Serial Bus port) and removal from the port. This repeated insertion and removal can place stress on the security token, the port, or both. More specifically, this operation or handling of the security token can place stress on components such as solder pins, wires, shell components, shields, or the like.

Additionally, some registration, authentication, or other operational steps require a user to press or otherwise activate a button on a security token. If the security token is already connected to a computer port, this activation may impart an additional force orthogonal to the connection between the security token and the computer port, imparting additional stress on the token and the port.

The rigidity of security tokens also can pose a problem if the token is inadvertently contacted while physically connected to a computing system. If a security token is plugged into, for example, a laptop being carried by a user, the user may inadvertently handle the laptop such that the security token contacts a wall or other type of structure. Such unintentional contact may damage the security token, the laptop port, or both.

Embodiments described herein provide novel hardware authentication devices and methods of manufacturing the same. The disclosed hardware authentication device includes a connection component configured to establish a physical connection with a computing system configured to perform at least an authentication procedure. The hardware authentication device further includes a housing including a screen portion to at least visually present authentication data as part of an interaction with the computing system, and a cable portion connecting the housing and the connection component. The cable portion is configured to prevent stress from being imparted on the connection component at least due to handling of the housing, such as while the connection component is being connected to the computing system, while the connection component is physically connected with the computing system, while the connection component is being disconnected from the computing system, or the like.

Figure 1A:
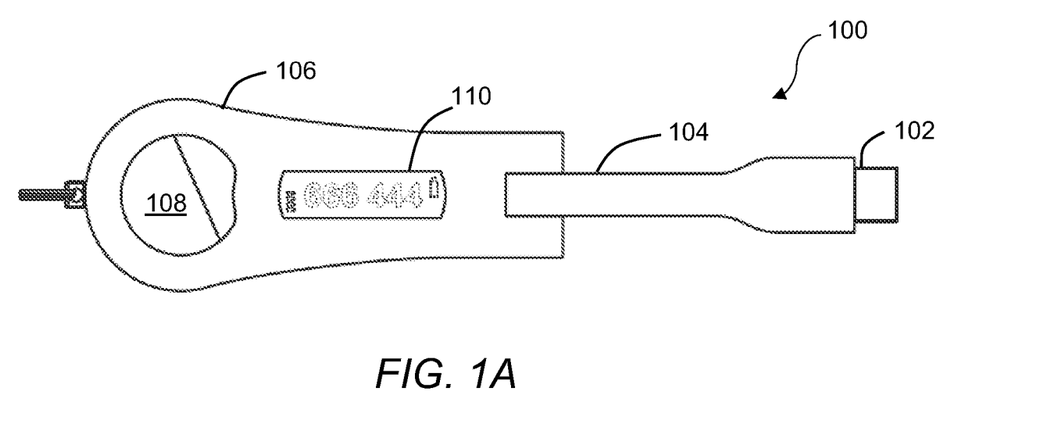
FIGS. 1A-1F illustrate various views of a hardware authentication device in an open position in accordance with one embodiment.
Figure 1B:
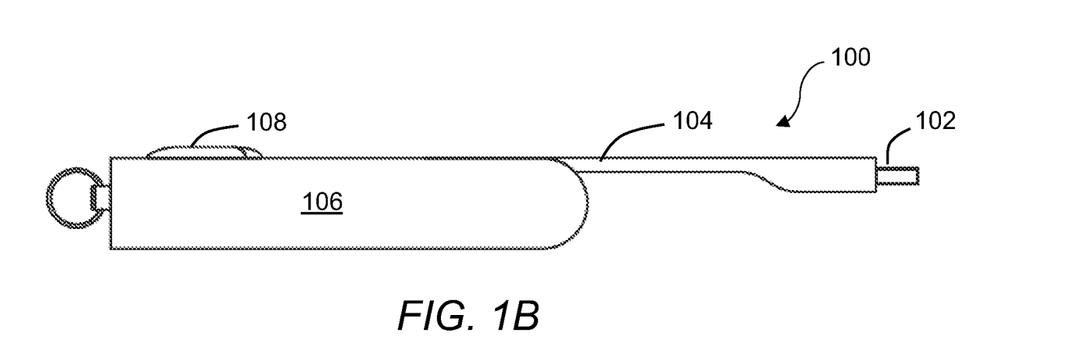
Figure 1C:
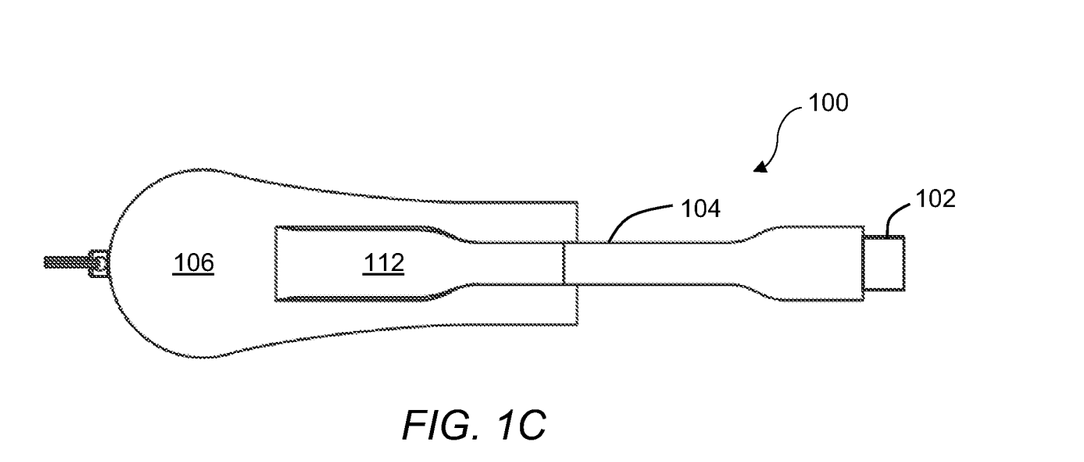
Figure 1D:
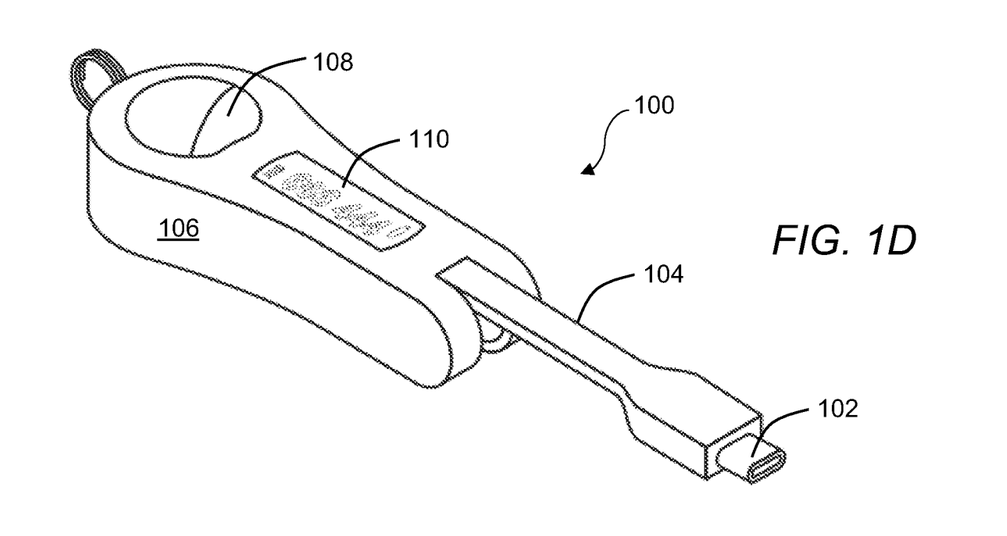
Figure 1E:
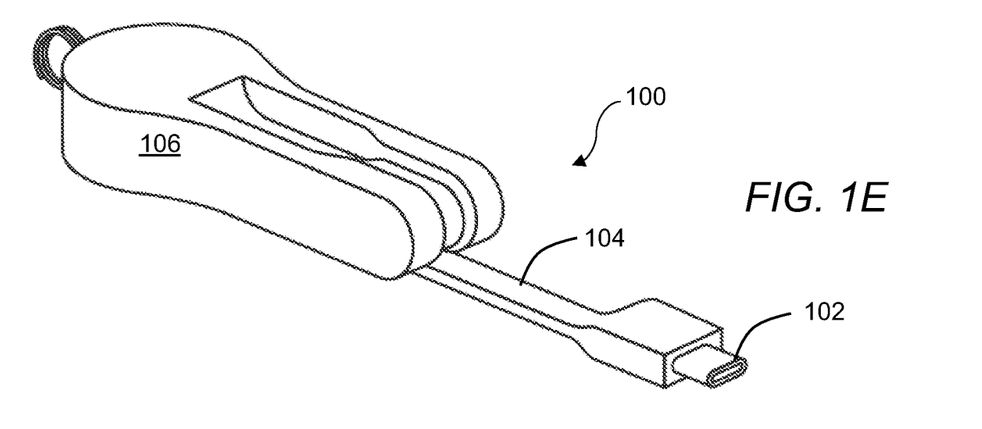
Figure 1F:
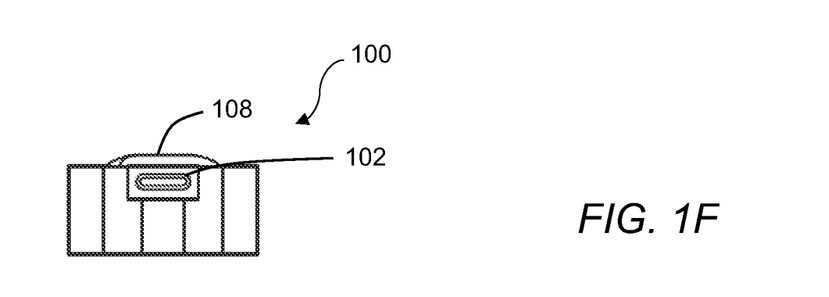

FIGS. 1A-1F illustrate various views of a hardware authentication device 100 in accordance with one embodiment. FIG. 1A illustrates a top view of the authentication device 100;

FIG. 1B, a side view; FIG. 1C, a bottom view; FIG. 1D, a top perspective view; FIG. 1E, a bottom perspective view; and FIG. 1F, a front view.

The hardware authentication device 100 includes a connection component 102, a cable portion 104, and a housing 106. The authentication device 100 is illustrated in FIGS. 1A-1F in an "open" position, in which the cable portion 104 is extended to enable the connection component 102 to connect the housing 106 to a computing system. The authentication device 100 may also include an activation component 108 and a screen portion 110, discussed below.

In the context of the present application, the term "computing system" may refer to any type of device, phone, laptop, tablet, appliance, computer, server, or other type of structure configured to receive or otherwise physically connect with the hardware authentication device 100. The computing system may control access to a resource and, if the authentication is successful, allow access to said resource. The type of resource(s) protected by the computing system may vary.

The connection component 102 may include any type of component able to establish a physical connection with a component of the computing system to conduct an authentication procedure or perform other operations. For example, the connection component 102 may be inserted into a port of the computing system such that pins or electrical contacts associated with the connection component 102 establish an electrical connection with associated parts of the port.

In some embodiments, the connection component 102 may be a USB connection component. The connection component may be, for example, a USB Type-A, Type-B, or Type-C component. The connection component 102 (as well as the hardware authentication device 100 in general) is also not limited to any particular data transfer speed. For example, the connection component 102 may use version 2.0 of the USB standard, version 3.0, version 3.1, etc.

The exact configuration or type of connection component 102 may vary and other types of connection components, whether available now or invented hereafter, may be used in accordance with the embodiments herein. The connection component 102 need not be a USB connection component, either. Other types of connector systems and protocols may be used, and may be dependent on the computing system.

The connection component 102 also need not be a "male" connection component as is understood to one of ordinary skill in the art. Rather, the connection component 102 may be configured as a "female" component and connect to a male component as part of the computing system. Accordingly, the exact configuration of the connection component 102 and how it establishes a physical connection with the computing system may vary.

The cable portion 104 may connect the connection component 102 with the housing 106. The cable portion 104 may include any required wires or combination of wires to communicate data between the connection component 102 and the components of the housing 106.

The exact length of the cable portion 104 may vary. However, the cable portion 104 should be long enough in length and flexible to allow a user to manipulate the housing 106 such as during an interaction with the computing system. In operation the user may want to rotate, manipulate, or otherwise handle the housing 106 during an interaction with the computing system to, e.g., improve the visibility of the screen portion 110.

Although the present application largely discusses the hardware authentication device in conjunction with an "authentication procedure," the disclosed interactions are not limited to only authentication processes. For example, interactions involving the hardware authentication device and the computing system may include an authentication procedure, a credential registration procedure, a hardware authentication device management procedure, a firmware-update procedure, or the like.

The housing 106 may be formed from any suitable material using any suitable process. For example, the housing may be formed from plastic, resin, composites, or the like. The housing 106 may be formed through a process such as injection molding, additive manufacturing, or the like. The exact type of the material(s) of the housing 106, as well as the process(es) by which it is manufactured, may vary as long as the features of the embodiments herein may be accomplished.

The housing 106 may include an activation component 108 that is activated as part of an interaction with a computing system. The activation component 108 may be configured as one or more depressible portions, e.g., button(s), a switch, a touch-based sensor, the like. An authentication procedure may require a user to, for example, engage the activation component 108 to receive an OTP. The exact type or configuration of the activation component 108 may vary, and other types of activation components whether available now or invented hereafter may be used in conjunction with the various embodiments herein.

The screen portion 110 may present data as part of an authentication procedure such as a generated OTP. The screen portion 110 may also present other types of data, such as a power level of a battery of the authentication device 100. Accordingly, the housing 106 should be sized to contain one or more batteries and the screen portion 110 should be sized to sufficiently present a password as required by any applicable standards.

By separating the housing 106 and the connection component 102, engagement of the activation component 108 does not impart stress or force on the connection component 102 or the computing system. This at the very least reduces the likelihood the connection component and the computing system will be damaged as part of the operation.

As seen in FIG. 1C, the housing 106 may include an aperture portion 112 configured to receive the cable portion 104, the connection component 102, or both. For example, when the authentication device 100 is not in use (e.g., not physically connected with a computing system), a user may place the connection component 102 and the cable portion 104 in the aperture portion 112. This may protect the connection component 102 and cable portion 104 from unwanted contact or debris such as dust, liquid, or the like.

Figure 2A:
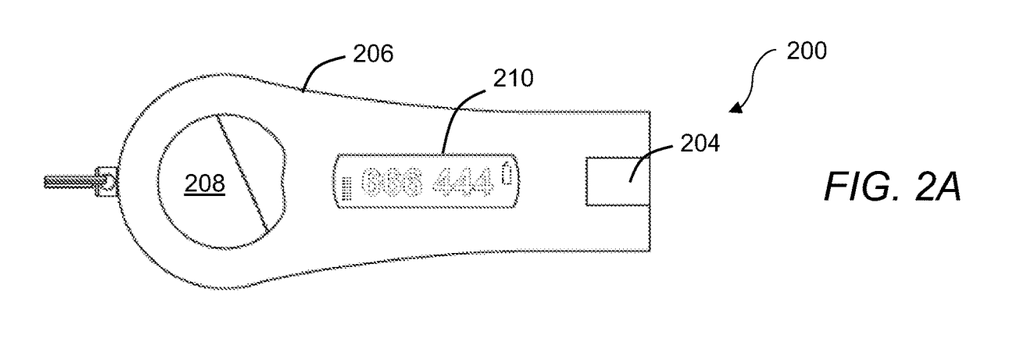
FIGS. 2A-2F illustrate various views of a hardware authentication device in a closed position in accordance with one embodiment.
Figure 2B:
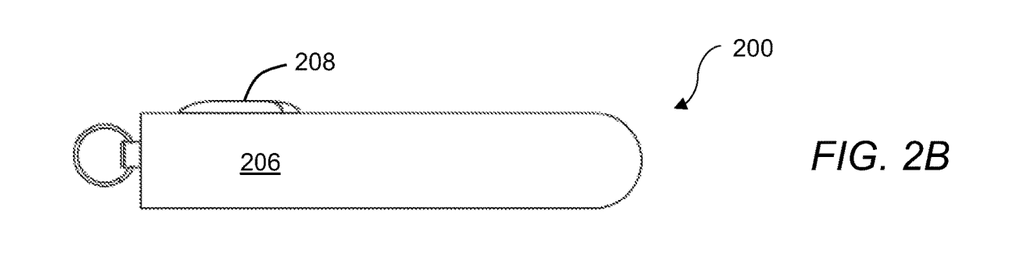
Figure 2C:
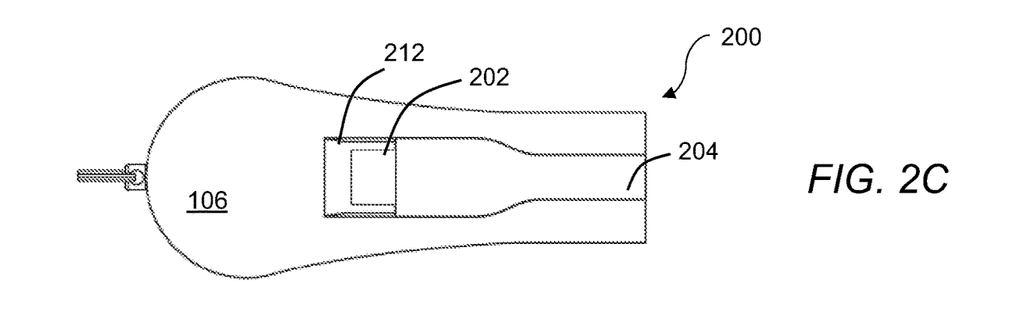
Figure 2D:
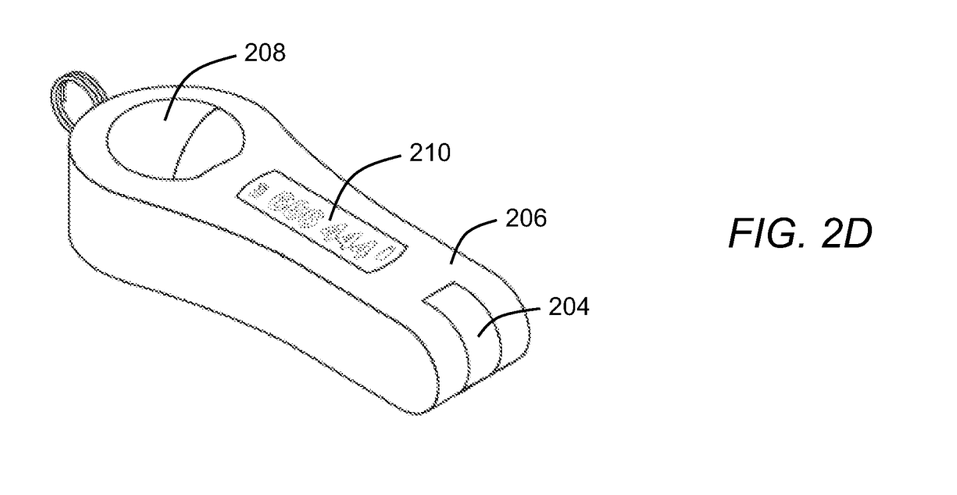
Figure 2E:
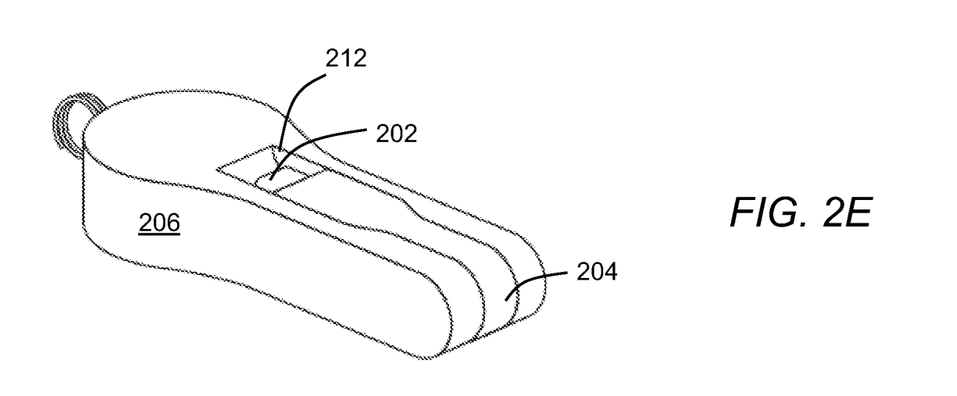
Figure 2F:
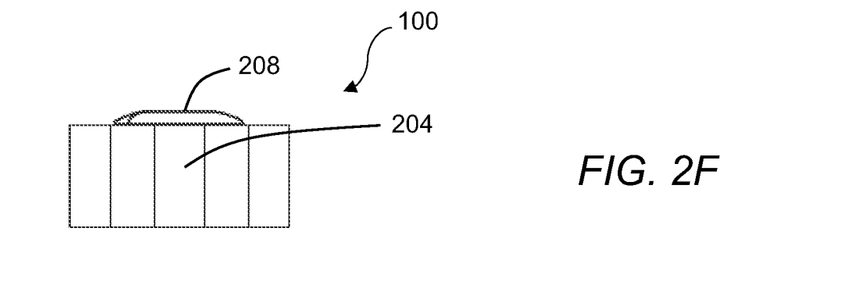

FIGS. 2A-2F illustrate various views of a hardware authentication device 200 in accordance with one embodiment. The hardware authentication device 200 may be similar to the hardware authentication device 100 of FIGS. 1A-1F, and may include a connection component 202, a cable portion 204, a housing 206, an activation component 208, a screen portion 210, and an aperture portion 212. FIG. 2A illustrates a top view of the hardware authentication device 200;

FIG. 2B, a side view; FIG. 2C, a bottom view; FIG. 2D, a top perspective view; FIG. 2E, a bottom perspective view; and FIG. 2F, a front view.

FIGS. 2A-2F illustrate the hardware authentication device 200 in a "closed" position. That is, as seen in FIGS. 2C and 2E, the connection component 202 and the cable portion 204 are placed within the aperture portion 212.

Figure 3:
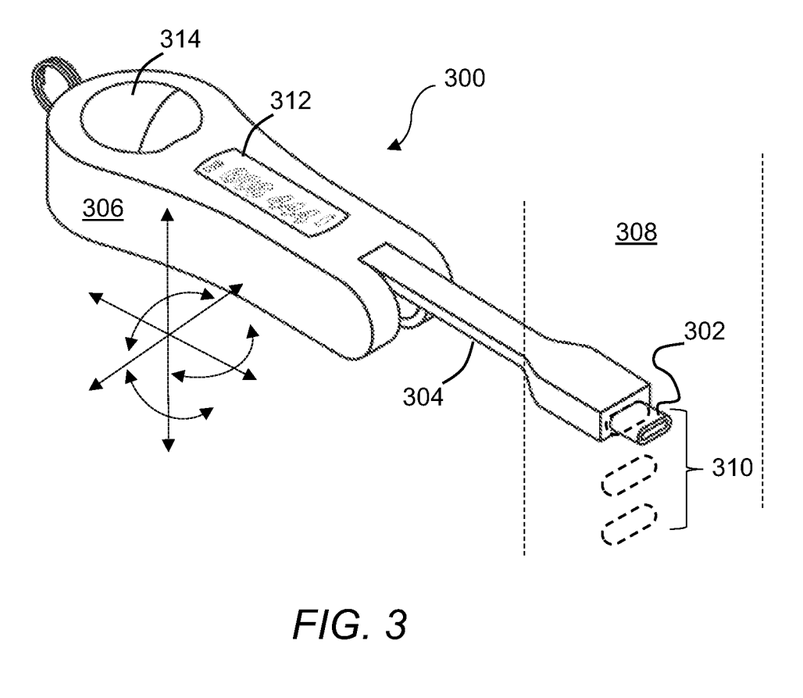
FIG. 3 illustrates a hardware authentication device physically connected to a computing system in accordance with one embodiment.

The flexible nature and length of the cable portions 104 and 204 may enable the user to move the housing in six degrees of motion. For example, FIG. 3 illustrates a hardware authentication device 300 connected to a computing system 308 in accordance with one embodiment. The hardware authentication device 300 of FIG. 3 may be similar to the devices 100 and 200 of FIG. 1 and FIG. 2, respectively, and may include a connection component 302, a cable portion 304, and a housing 306.

Specifically, FIG. 3, illustrates the hardware authentication device 300 connected to the computing system 308 by one of a plurality of ports 310. As seen in FIG. 3, the cable portion 304 allows the housing 306 to be manipulated or otherwise moved in six degrees of motion, even while the connection component 302 is physically connected with the computing system 308.

This maneuverability may be desirable during use, such as if the user wants to rotate or otherwise manipulate the authentication device 300. For example, the user may want to rotate the authentication device 300 to better view the screen portion 312. Similarly, the user may want to manipulate the authentication device 100 to activate the activation component 314, or such movement may result from activation of the activation component 314

Figure 4:
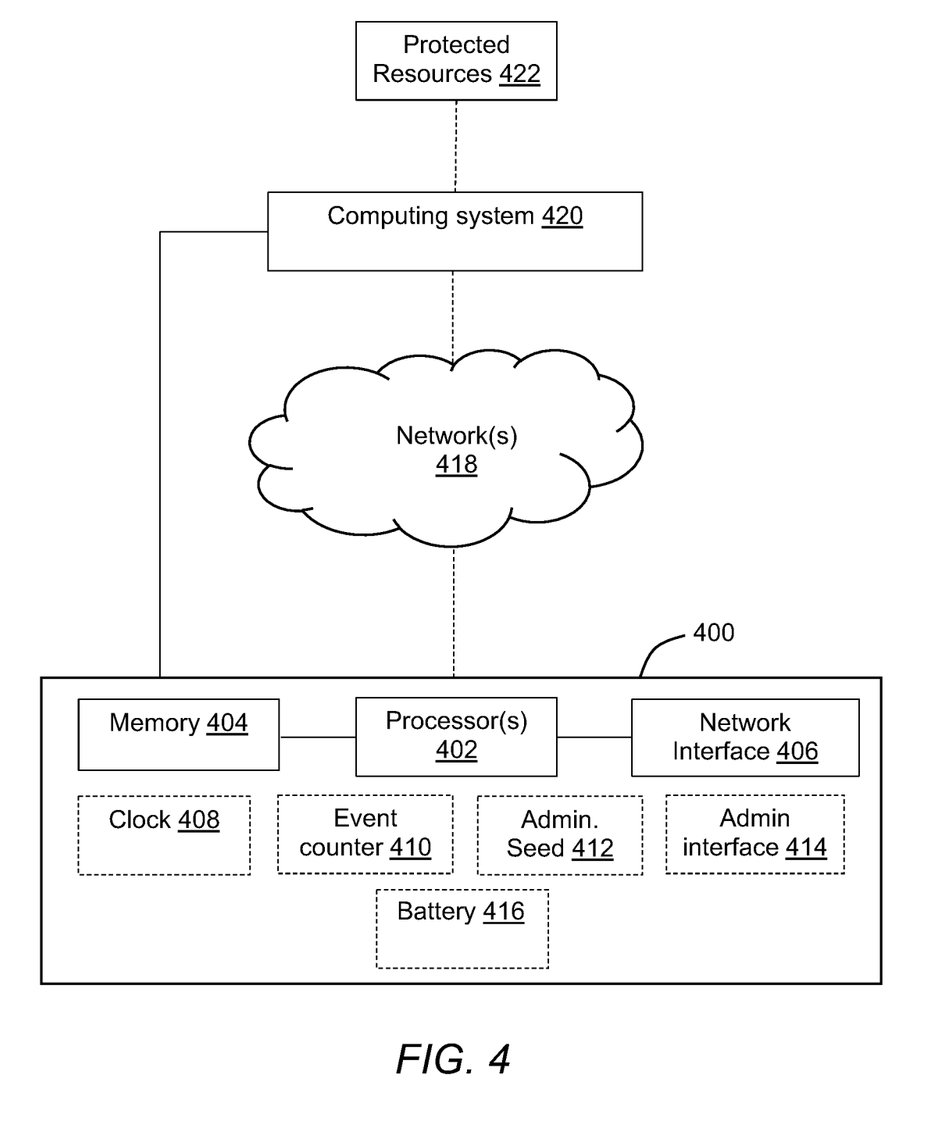
FIG. 4 illustrates a diagram of a hardware authentication device in accordance with one embodiment.

The authentication devices described herein and, specifically, the housings may also contain or otherwise house any electronics and components to enable the authentication device to perform the required interactions with a computing system. FIG. 4 illustrates a block diagram of a hardware authentication device 400 in accordance with one embodiment. The hardware authentication device 400 may be similar to the hardware authentication devices of FIGS. 1-3, for example.

The hardware authentication device 400 may include one or more processors 402 executing instructions stored on memory 404 to enable the authentication device 400 to perform one or more interactions with a computing system such as authentication procedures. The authentication device 400 may further include or otherwise execute a network interface 406, a clock module 408, an event counter 410, an administrative seed value 412, an administration interface 414, and a battery 416. FIG. 4 also illustrates the authentication device 400 in communication with one or more networks 418, computing systems 420, and protected resources 422.

The processor(s) 402 may be any hardware device capable of executing instructions stored on memory 404 to provide various components or modules. The processor 402 may include a microprocessor, a field programmable gate array (FPGA), an application-specific integrated circuit (ASIC), or other similar devices. In some embodiments, such as those relying on one or more ASICs, the functionality described as being provided in part via software may instead be configured into the design of the ASICs and, as such, the associated software may be omitted.

The memory 404 may be L1, L2, L3 cache, or RAM memory configurations. The memory 404 may include non-volatile memory such as flash memory, EPROM, EEPROM, ROM, and PROM, or volatile memory such as static or dynamic RAM, as discussed above. The exact configuration/type of memory 404 may of course vary as long as instructions for interacting with a computing system such as to perform an authentication procedure can be performed by the authentication device 400.

The authentication procedures executed by the authentication device 400 and the computing system 420 may vary. The embodiments herein may execute, for example, Fast IDentity Online (FIDO) password authentication procedures, one-time password (OTP) authentication procedures, or the like. Other types of authentication procedures, whether available now or invented hereafter, may be used in conjunction with the embodiments herein.

The network interface 406 may allow the hardware authentication device 400 to communicate over the network(s) 418 with the computing system 420 and the protected resource(s) 422. The hardware authentication device 400 may comprise various modules depending on the type of authentication procedures or other types of operations to be performed. For example, the clock module 408 may keep track of time between initial setup of the device 400 and performance of authentication procedures. The clock module 408 may act as a timer that may be used to produce passwords as determined by an algorithm executed by the processor(s) 402. In these types of authentication procedures, the clock module 408 may be synchronized with a clock associated with the computing system 420. Accordingly, the password generated by the authentication device 400 will match the password generated by the computing system 420 as determined by the clock module 408.

As another example, the event counter 410 may keep track of the number of authentication procedures performed by the authentication device 400. The number of tracked events may be used by an algorithm executed by the processor(s) 402 to generate a password. In these types of authentication procedures, the event counter 410 may be synchronized with an event counter associated with the computing system 420. Accordingly, the password generated by the authentication device 400 will match the password generated by the computing system 420 as determined by the number of events.

The administrative seed value 412 stored in the authentication device 400 may comprise a cryptographic key or other secret that is shared with the computing system 420. This cryptographic key or shared secret is utilized in conjunction with the computing system 420 via an administrative interface 414. The administrative seed value 412 may comprise a static seed value that is randomly generated. The administrative seed value 412 may be programmed into the authentication device 400 during manufacture, for example.

The network interface 406 may comprise one or more conventional transceivers. The network interface 406 may also support various types of communication utilizing out-of-band channels.

The term "out-of-band channel" in this context is intended to be broadly construed so as to encompass a different network connection than that typically used for communication between the authentication device 400 and the computing system 420. More particular examples of out-of-band channels that may be utilized in illustrative embodiments include text messaging channels, email channels, telephony channels, physical delivery channels, etc.

It is to be appreciated that the particular set of elements shown in FIG. 4 for providing various functionality is presented by way of example, and in other embodiments additional or alternative elements may be used. Thus, another embodiment may include additional networks and additional sets of devices, authentication servers, or protected resources.

The authentication device 400 can include additional or alternative elements, with those included being dependent on the type of operations to be performed. For example, the authentication device 400 can include an event-based OTP generator for generating expected event-based OTPs for comparison with received event-based OTPs.

Also, a variety of different authentication processes may be used in illustrative embodiments. Examples of conventional authentication processes are disclosed in A. J. Menezes et al., Handbook of Applied Cryptography, CRC Press, 1997, which is incorporated by reference herein. These conventional processes, being well known to those skilled in the art, will not be described in further detail herein, although illustrative embodiments may incorporate aspects of such processes.

It should also be noted that various types of cryptographic functions disclosed in the above-cited A. J. Menezes reference can be utilized in generating event-based OTPs in the authentication device 400 and comparing received event-based OTPs with expected event-based OTPs in illustrative embodiments herein.

As mentioned previously, various elements of the authentication device 400 may be implemented at least in part in the form of software. Such software is stored and executed utilizing respective memory and processor elements of at least one processor 402. The hardware authentication device 400 may include or otherwise use additional or alternative processing platforms, as well as numerous distinct processing platforms in any combination, with each such platform comprising one or more computers, storage devices or other types of processing devices.

For example, the authentication device 400 can be implemented on a processing platform that comprises a plurality of processing devices. One illustrative embodiment of a processing platform that may be used to implement at least a portion of the hardware authentication device 400 comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the authentication device 400.

These and other types of cloud infrastructure can be used to provide what is also commonly referred to as a multi-tenant environment. One or more platform components such as virtual machines, or portions thereof, are illustratively implemented for use by tenants of such a multi-tenant environment.

The authentication device 400 may be in operable connectivity with one or more computing systems 420 over one or more networks 418. The network(s) 418 may link the authentication device 400 with various types of network connections. The network(s) 418 may be comprised of, or may interface to, any one or more of the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1, or E3 line, a Digital Data Service (DDS) connection, a Digital Subscriber Line (DSL) connection, an Ethernet connection, an Integrated Services Digital Network (ISDN) line, a dial-up port such as a V.90, a V.34, or a V.34bis analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

The network or networks 418 may also comprise, include, or interface to any one or more of a Wireless Application Protocol (WAP) link, a Wi-Fi link, a microwave link, a General Packet Radio Service (GPRS) link, a Global System for Mobile Communication (GSM) link, a Code Division Multiple Access (CDMA) link, or a Time Division Multiple access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based link.

The computing system 420 may comprise any type of processing device or set of such devices that is operative to, for example, register a hardware authentication device, issue credentials, authenticate a password or other credential submitted by the hardware authentication device 400, or the like. It need not be a network-based server, and may be implemented as a portion of a device that performs other functions, as a combination of multiple servers or other devices, or in other forms.

The protected resource(s) 422 may comprise, for example, a multi-user computer system, a web site, an application, etc. Such a protected resource in some embodiments may reside at least in part on the computing system 420 rather than being separate from the computing system 420 as illustrated in FIG. 4.

Figure 5:
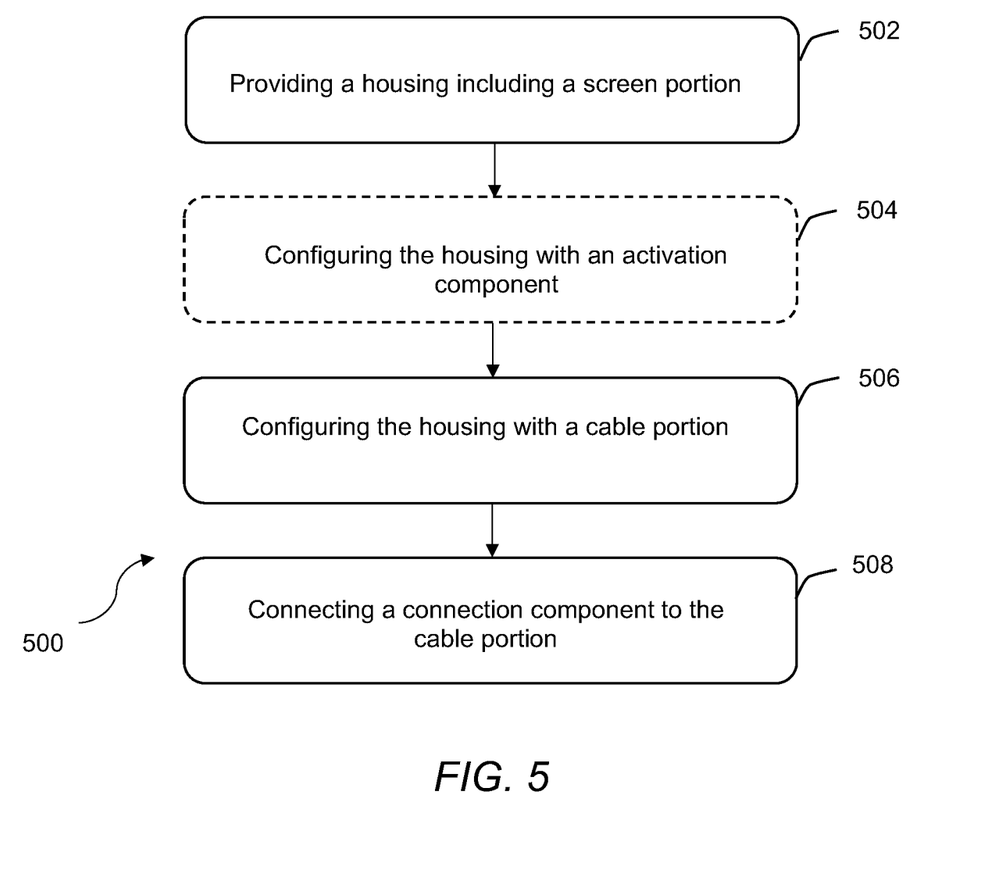
FIG. 5 depicts a flowchart of a method for manufacturing a hardware authentication device in accordance with one embodiment.

FIG. 5 depicts a flowchart of a method 500 for manufacturing a hardware authentication device in accordance with one embodiment. The authentication device may be similar to the hardware authentication device of FIGS. 1-4, for example.

Step 502 involves providing a housing including a screen portion to at least visually present authentication data as part of an interaction with a computing system. The computing system may be configured to perform an authentication procedure, for example. The screen portion may be configured to present data such as a password, battery level of the hardware authentication device, or the like. The housing may also store or otherwise include any electronics required to interact with the computing system.

Step 504 is optional and involves configuring the housing with an activation component engageable as part of the interaction with the computing system. In some embodiments, the activation component may be a button or a switch. In operation, a user may need to engage the activation component as part of an authentication procedure or other type of operation. For example, if the activation component is a button, a user may need to press the button to receive a password.

Step 506 involves configuring the housing with a cable portion. The cable portion may include one or more wires or the like to transmit data to and from the electronics of the housing. The cable portion should be flexible and long enough to enable the user to maneuver the housing to, for example, better view the screen portion during an operation.

Step 508 involves connecting a connection component to the cable portion. The connection component should be configured to establish a physical connection with a computing system.

This engagement of the activation component may place additional stress on the hardware authentication device, the computing system to which the authentication device is physically connected, or both. Accordingly, separating the housing and the connection component with the cable portion prevents stress from being imparted on the connection component at least due to handling of the housing.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A hardware authentication device comprising:
 a connection component configured to establish a physical connection with a computing system;
 a housing including a screen portion to at least visually present authentication data as part of an interaction with the computing system, wherein the screen portion is oriented to face in a first direction relative to the housing; and
 a cable portion connecting the housing and the connection component, wherein the cable portion is configured to prevent stress from being imparted on the connection component at least due to handling of the housing;
 wherein the housing further includes an aperture formed within an external surface of the housing and adapted to store at least a portion of the cable portion and the connection component when the connection component is not physically connected with the computing system, wherein the aperture is at least partially oriented to face in a second direction relative to the housing, the second direction opposite the first direction.

2. The authentication device of claim 1 wherein the authentication data includes a single-use password.

3. The authentication device of claim 1 wherein the housing further includes an activation component engageable as part of the interaction with the computing system, the handling including engagement of the activation component.

4. The authentication device of claim 3 wherein the activation component includes at least one of a depressible portion and a switch, wherein the handling of the housing includes engagement with the depressible portion or the switch.

5. The authentication device of claim 1 wherein the housing further includes one or more processors executing instructions stored on memory to execute at least one of:

a one-time password (OTP) authentication procedure, or a Fast IDentity Online (FIDO) authentication procedure.

6. The authentication device of claim 1 wherein the housing is movable with respect to the connection component in six degrees of motion while the connection component is physically connected with the computing system.

7. The authentication device of claim 1 wherein the housing is sized to include a battery and the screen portion is sized to at least visually present a password.

8. The authentication device of claim 1 wherein the cable portion is configured to prevent stress from being imparted on the computing system at least due to handling of the housing.

9. The authentication device of claim 1 wherein the interaction with the computing system includes at least one of a credential registration process, an authentication procedure, and a hardware authentication device management procedure.

10. A method of manufacturing a hardware authentication device, the method comprising:
providing a housing;
configuring a first surface of the housing with a screen portion to at least visually present authentication data as part of an interaction with a computing system, wherein the first surface of the housing is oriented to face in a first direction;
configuring the housing with a cable portion;
configuring a second surface of the housing with an aperture to store at least a portion of the cable portion and the connection component when the connection component is not physically connected with the computing system, wherein the second surface is oriented to face in a second direction opposite the first direction; and
connecting a connection component to the cable portion, wherein the connection component is configured to establish a physical connection with the computing system, and the cable portion is configured to prevent stress from being imparted on the connection component at least due to handling of the housing.

11. The method of claim 10 wherein the authentication data includes a single-use password.

12. The method of claim 10 further comprising configuring the housing with an activation component engageable as part of the interaction with the computing system, the handling including engagement of the activation component.

13. The method of claim 12 wherein the activation component includes at least one of a depressible portion and a switch, wherein the handling of the housing includes engagement with the depressible portion or the switch.

14. The method of claim 10 wherein the housing further includes one or more processors executing instructions stored on memory to execute at least one of:
a one-time password (OTP) authentication procedure, or a Fast IDentity Online (FIDO) authentication procedure.

15. The method of claim 10 wherein the housing is movable with respect to the connection component in six degrees of motion while the connection component is physically connected with the computing system.

16. The method of claim 10 wherein the housing is sized to include a battery and the screen portion is sized to at least visually present a password.

17. The method of claim 10 wherein the cable portion is configured to prevent stress from being imparted on the computing system at least due to handling of the housing.

18. The method of claim 10 wherein the interaction with the computing system includes at least one of a credential registration process, an authentication procedure, and a hardware authentication device management procedure.

* * * * *